March 8, 1955 G. W. VON HOFE ET AL 2,703,660
LABELING MACHINE
Filed Jan. 19, 1954 9 Sheets-Sheet 1

INVENTORS
GEORGE W. VON HOFE
BY EDWIN K. WOLFF
Klein & Hart
ATTORNEYS

INVENTORS
GEORGE W. VON HOFE
BY EDWIN K. WOLFF
Klein & Hart
ATTORNEYS

March 8, 1955
G. W. VON HOFE ET AL
2,703,660
LABELING MACHINE
Filed Jan. 19, 1954
9 Sheets-Sheet 3
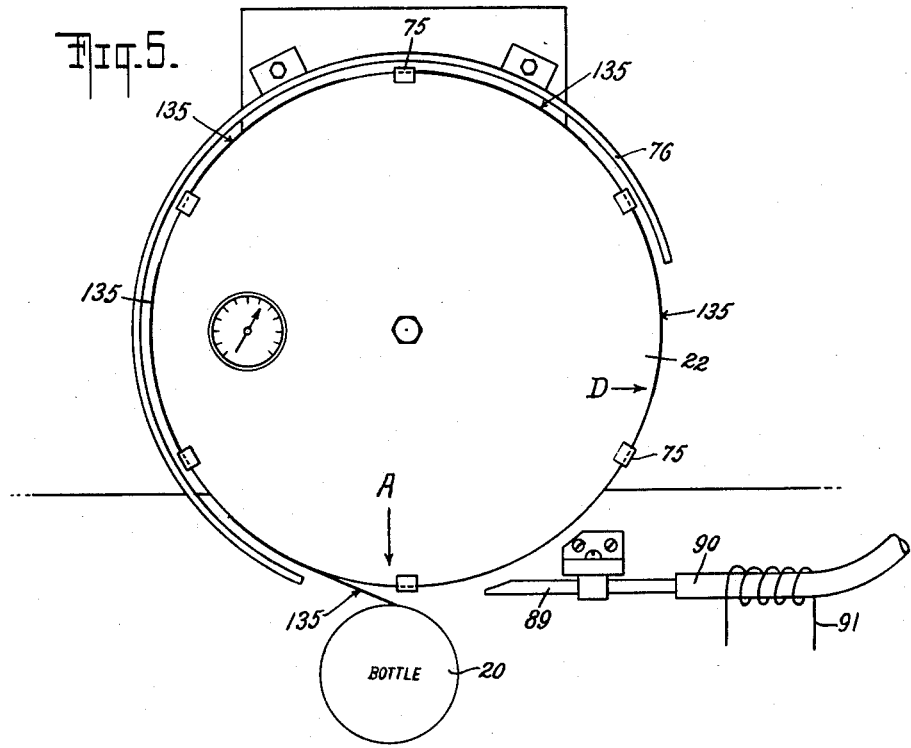
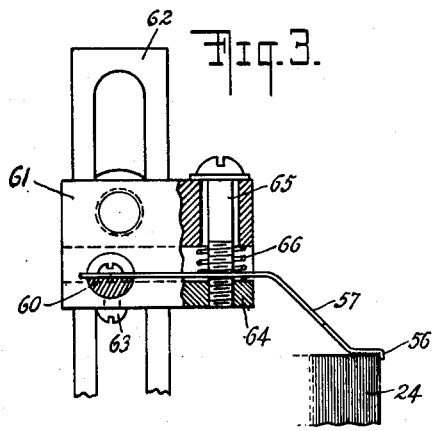
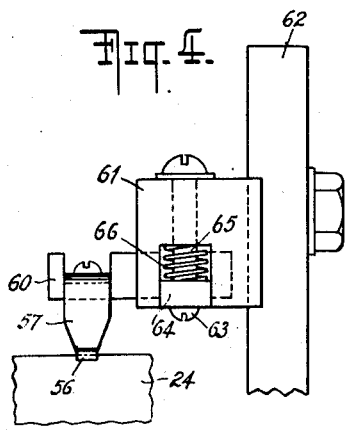
INVENTORS
GEORGE W. VON HOFE
BY EDWIN K. WOLFF
Klein & Hart
ATTORNEYS

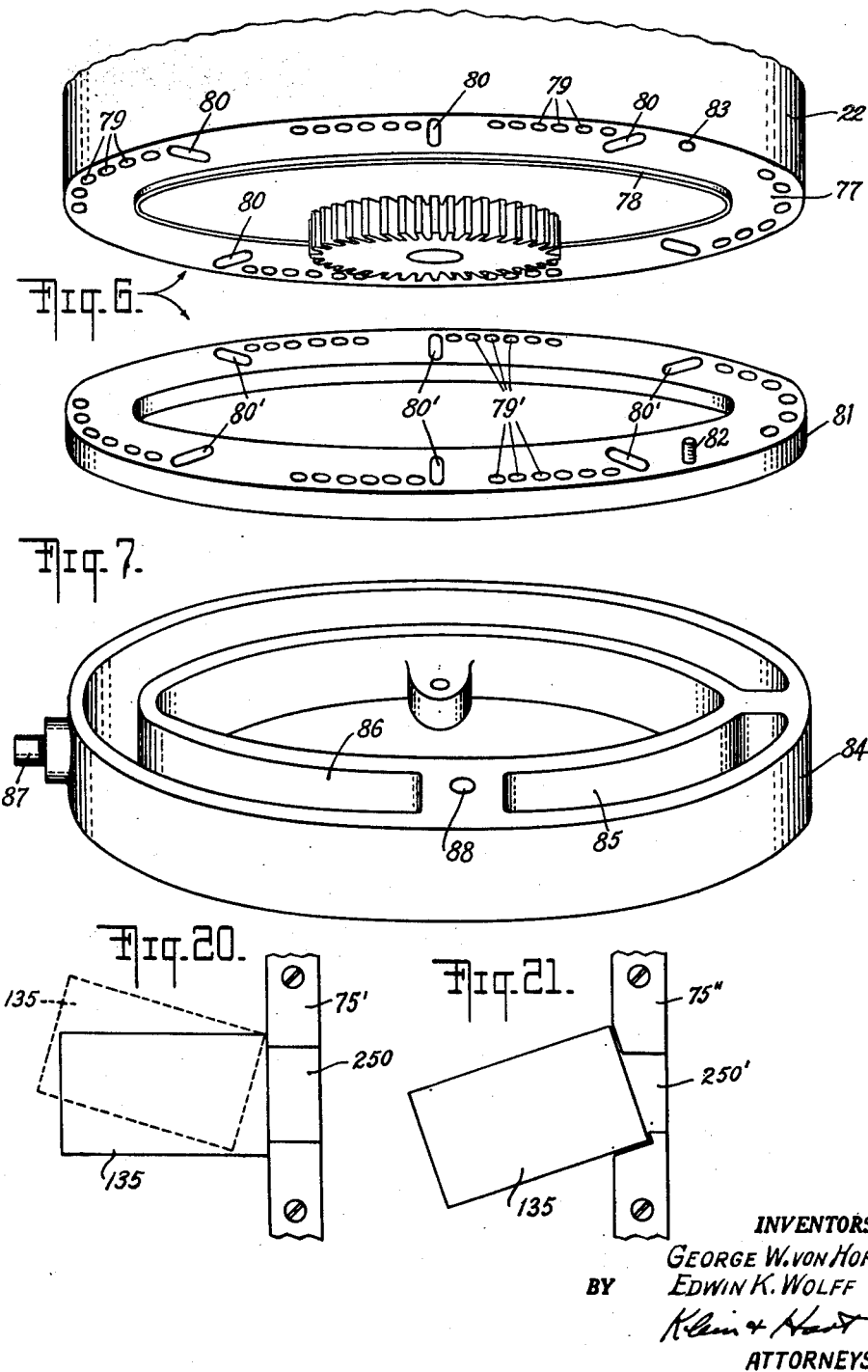

March 8, 1955
G. W. VON HOFE ET AL
2,703,660
LABELING MACHINE
Filed Jan. 19, 1954
9 Sheets-Sheet 5
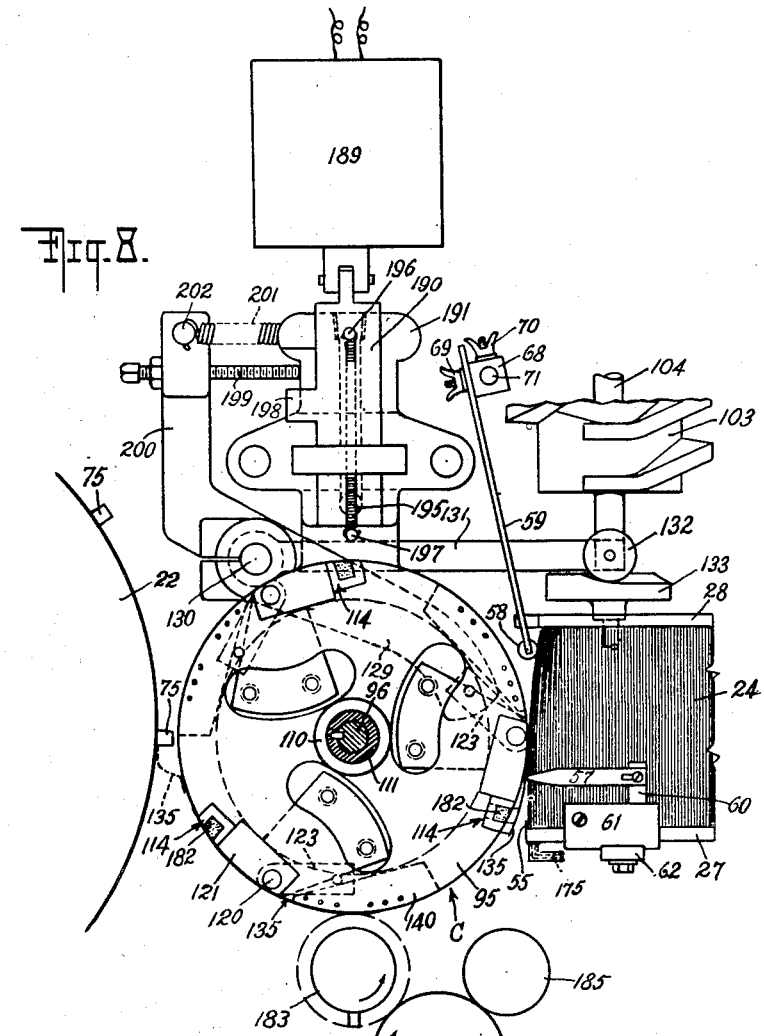
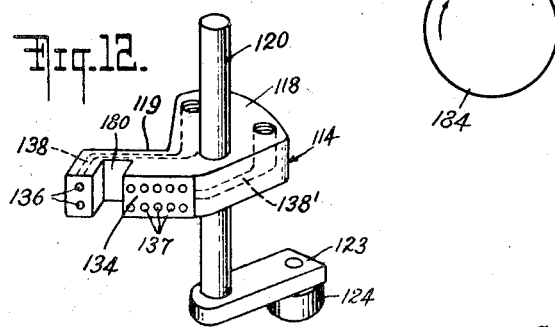
INVENTORS
GEORGE W. VON HOFE
BY EDWIN K. WOLFF
ATTORNEYS

INVENTORS
GEORGE W. VON HOFE
BY EDWIN K. WOLFF

ATTORNEYS

INVENTORS
GEORGE W. VON HOFE
EDWIN K. WOLFF
BY Klein & Hart
ATTORNEYS

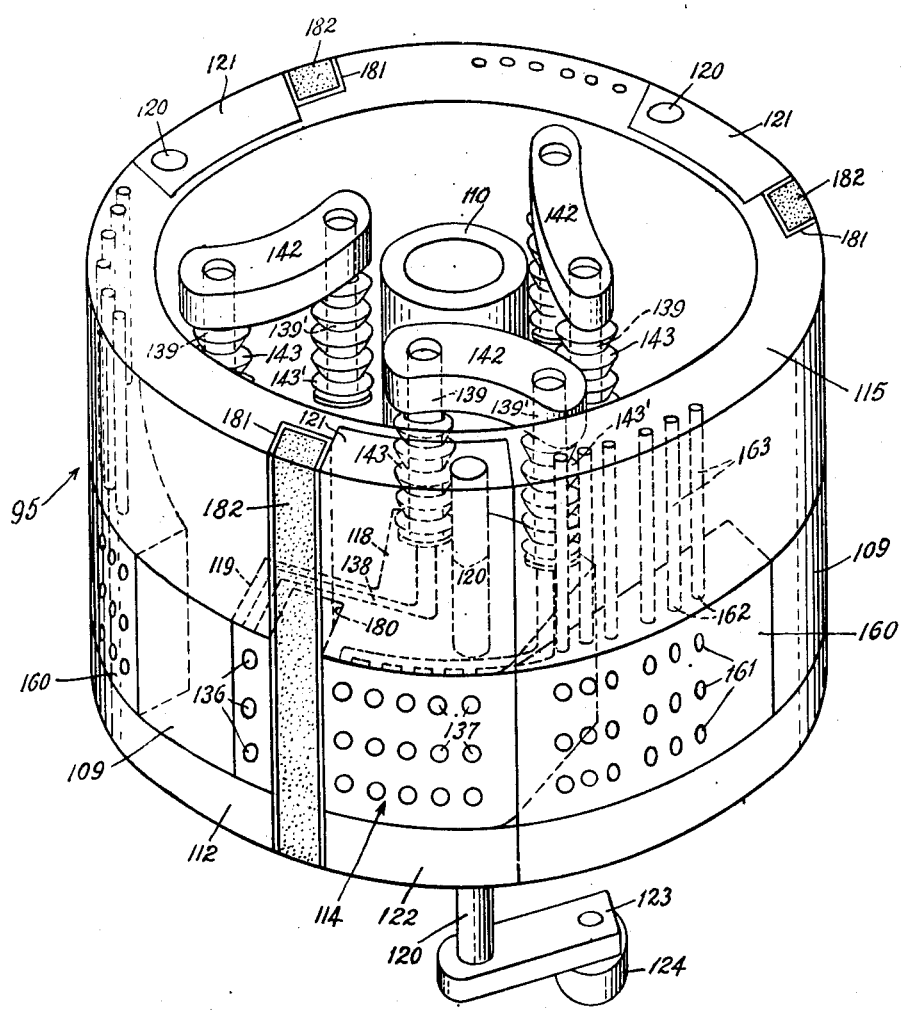

March 8, 1955  G. W. VON HOFE ET AL  2,703,660
LABELING MACHINE
Filed Jan. 19, 1954  9 Sheets-Sheet 9
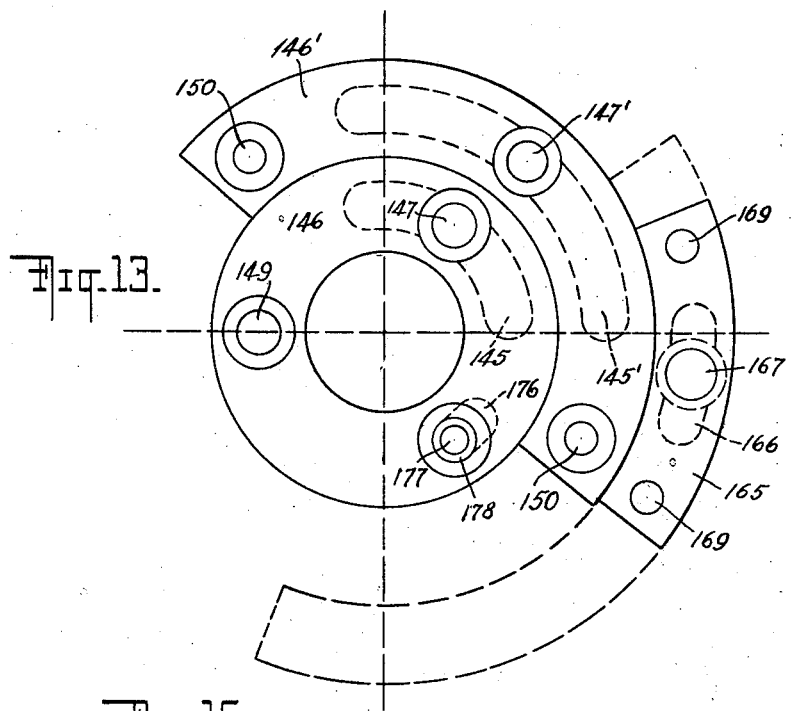
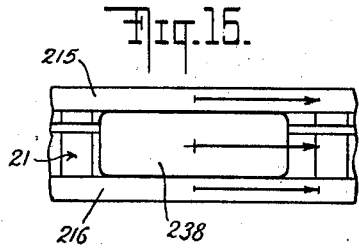
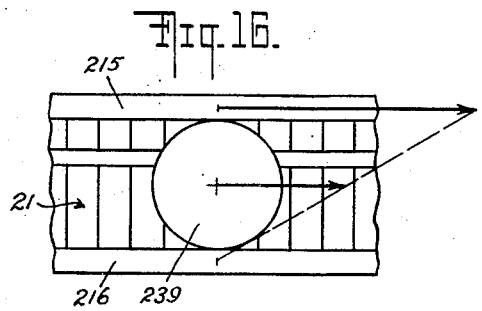
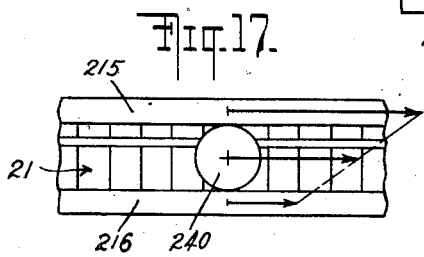
INVENTORS
GEORGE W. VON HOFE
BY EDWIN K. WOLFF
Klein & Hart
ATTORNEYS

United States Patent Office 2,703,660
Patented Mar. 8, 1955

2,703,660

LABELING MACHINE

George W. von Hofe, Millington, and Edwin K. Wolff, Stockholm, N. J., assignors to New Jersey Machine Corporation, Hoboken, N. J., a corporation of New Jersey Application January 19, 1954, Serial No. 404,864

30 Claims. (Cl. 216—55)

This invention relates to labeling machines and has for its primary object to provide an improved labeling machine capable of applying labels to articles of widely varying sizes and shapes in an efficient and uniform manner and at high speed.

In accomplishing the foregoing object, the invention provides improved means for feeding the labels successively from a source of supply to the point of application to an article. The invention further provides means for properly rendering adhesive one side of the labels as the labels are being transported by the feeding means, even though the labels may not be properly held by such feeding means and without any possibility of damage or injury to the materials of which the labels are constituted. The invention also proposes incorporating printing mechanism with the feeding means so that the labels may be imprinted as they are being fed from the source of supply to the point of article application. A further object of the invention is to provide means for so controlling the feeds of the labels and the articles to the point of application that at the latter a label will be brought into exact registry with the particular portion of the article to which the label is to be adhered. A still further object of the invention is to provide means for properly securing to an article a label deposited thereon at the point of application irrespective of the size or shape of the label and the article, thus rendering the machine capable of universal use for all types of bottles, boxes, cans, etc.

Other objects as well as the advantages and novel features of construction and combination of parts will appear from a perusal of the following description, when read in connection with the accompanying drawings, in which Fig. 1 is a schematic top plan view of a labeling machine embodying the features of this invention;

Fig. 3 is a detailed side elevational view, partly in section, of the label engaging finger and associated parts supporting such finger in the label hopper;

Fig. 4 is a right side view of the parts shown in Fig. 3;

Fig. 5 is a plan view of the label activating drum and the associated reflector and blowing means;

Fig. 6 is an exploded perspective view of the bottom wall of the label activating drum and the associated insulating ring;

Fig. 7 is a top perspective view of the valve plate on which the label activating drum rests;

Fig. 8 is a top plan view of a portion of the mechanism for transferring the labels from the label stack to the activating drum and of the means for controlling such mechanism;

Fig. 11 is a perspective view of the transfer drum with the top plate removed to show the interior parts thereof more clearly;

Fig. 12 is a perspective view of one of the mouthpieces for removing individual labels from the stack;

Fig. 13 is a top plan view of the suction shoes on the transfer drum;

Figs. 15, 16 and 17 are schematic views illustrating the different ways the label finishing mechanism may be operated with articles of different sizes and shapes;

Fig. 18 is a schematic top plan view showing a modified form of the invention;

Fig. 20 is a schematic view showing how a label is registered by the construction of Fig. 19, and Fig. 21 is a schematic view showing a further modification of the heating drum.

Figure 1:
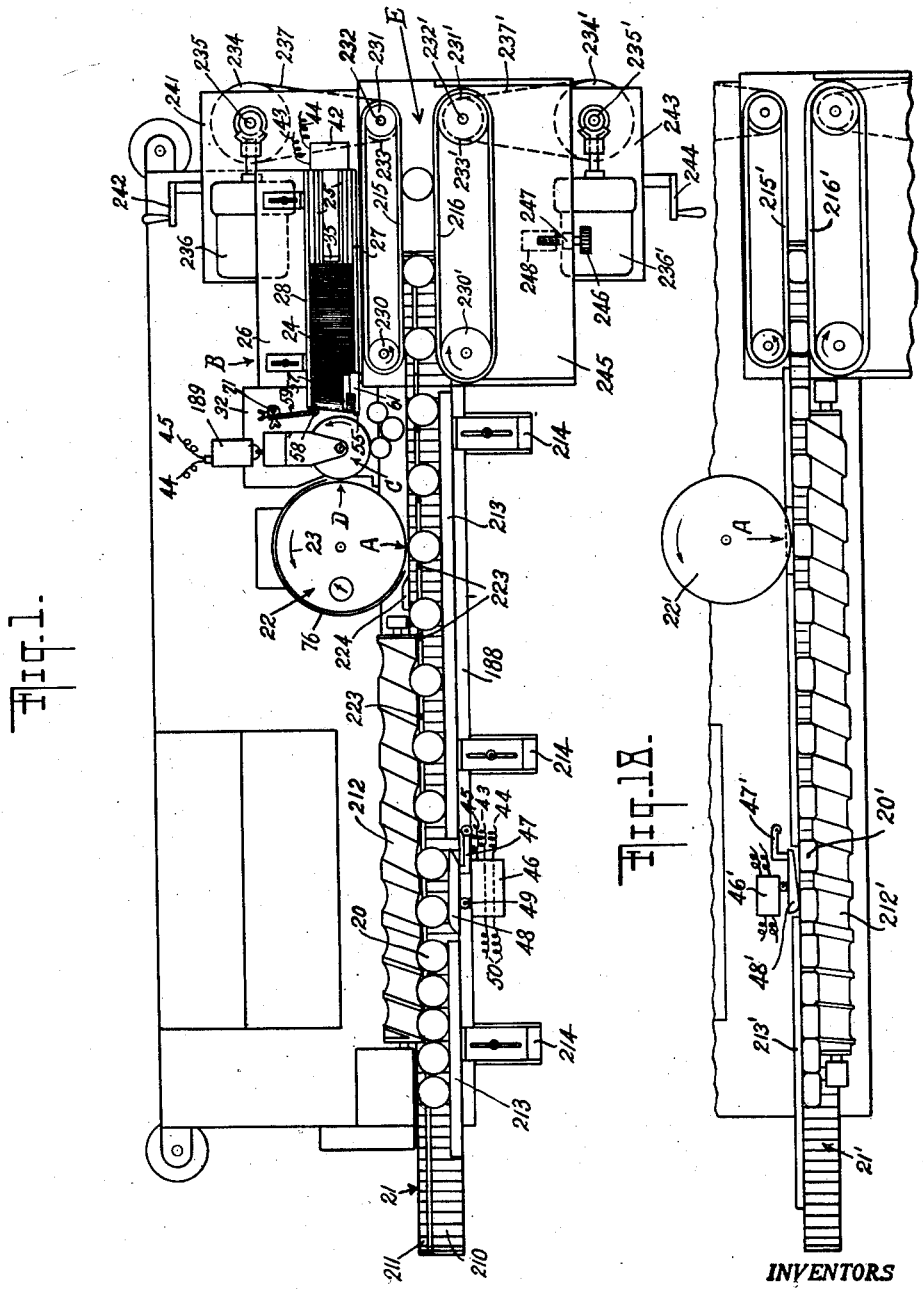

Before entering into a detailed description of the invention, it might be pointed out generally that substantially all of the novel features thereof are useful in any type of machine for handling labels or sheets. For the purposes of illustrating and describing such novel features however, the latter are shown as installed in a labeling machine designed particularly for handling labels or sheets coated with a normally inactive adhesive coating material which is susceptible to activation by means of heat, and of the type disclosed in Letters Patent No. 2,525,741 issued to G. W. von Hofe et al. on October 10, 1950. In such a machine, the articles to be labeled, such as bottles 20, are advanced toward the right, as viewed in Fig. 1 of the drawings, in a single file on a conveyor 21 extending along the front of the machine and to and past a label applying station designated generally by the reference letter A. At this station, labels carried thereto in successive fashion by a drum, designated generally by the numeral 22 and rotating in the direction of the arrow 23, are successively applied to the bottles 20. The labels are fed to the drum 22 from a source of label supply located at a supply station B by a pick-up mechanism designated generally by the letter C which transfers the labels to the drum 22 at what may be called a pick-up station D. In their travel on the drum 22 from the pick-up station D to the label applying station A, the thermoactivatable adhesive coatings on the labels are rendered adhesive so that an adhesive contact may be readily established at the station A between each label and the bottle 20 to which it is to be applied. From station A, the bottles 20 with the labels adhered thereto are carried by the conveyor 21 to a station E where mechanism is provided for pressing the labels into firm securement with the bottles and discharging the labeled bottles from the machine.

*Label supply*

Figure 2:
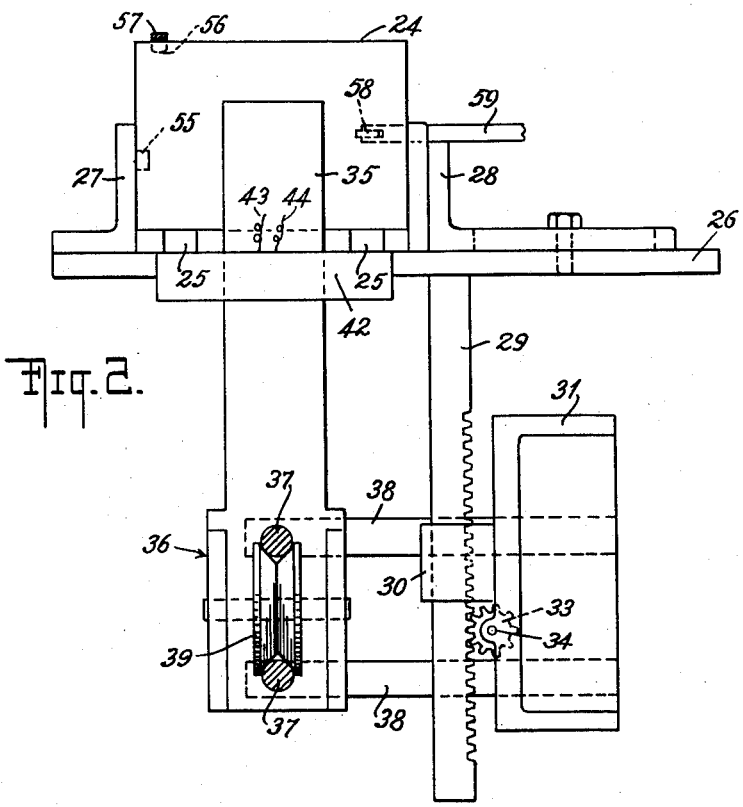
Fig. 2 is a detailed elevational view, partly in section, of the stack supporting and feeding mechanism; the parts thereof being viewed from the right of Fig. 1.

At the label supply station B, the labels are supported in the form of a stack 24 with their adhesive coated surfaces facing toward the pick-up or transfer mechanism C, or to the left, as viewed in Fig. 1 of the drawings. Since the material of such adhesive coatings is normally inactive, its engagement with certain of the parts of mechanism C during the picking of the labels from the stack and the transfer of such labels to the drum 22, will cause no interference with the operation of such parts. The stack 24 of labels is supported upon a pair of spaced rails 25, 25, provided on a plate 26. The sides of the stack are maintained in alignment by a side wall 27 secured to plate 26 and by a side wall 28 adjustably mounted on plate 26, as shown in Figs. 1 and 2 of the drawings. By adjusting side wall 28 relative to side wall 27, the hopper formed by such walls and rails 25 may be varied to accommodate labels of different widths. The plate 26 is mounted on the upper ends of a pair of longitudinally spaced vertical racks 29 which extend through guides 30 secured to a channel beam 31. The channel beam 31 is fixed at one end to a vertically adjustable support 32 for the transfer mechanism C (see Fig. 1). Engaging the teeth of each of the racks 29 below the guides 30 are pinions 33 which are mounted in spaced relation on a longitudinally extending shaft 34 rotatably supported on the channeled beam 31. A handwheel (not shown) connected to an end of shaft 34 enables the latter to be rotated manually, and through pinions 33 and racks 29, to adjust the vertical position of plate 26 and consequently the vertical position of the stack in the machine.

The rear of the stack is engaged by the upper end of a vertically disposed finger 35 which extends through a longitudinally extending slot in plate 26 between the rails 25, 25, and is carried by a carriage 36 provided with a plurality of freely rotating rollers 39 mounted between a pair of vertically spaced longitudinally extending rails 37, 37, to enable the carriage to be readily moved lengthwise of the stack. The rails 37, 37, are supported at their ends by two pairs of brackets 38, 38, secured to the ends of the channeled member 31. The carriage 36 and consequently the finger 35 are normally urged toward the front of the hopper or to the left, as viewed in Fig. 1 of the drawings, by a string (not shown) which is secured at one end to the front end of such carriage, passes over pulley wheels (not shown) mounted for free rotational movement on the brackets 38, 38, and has secured to its other end a depending weight (not shown). The operator may replenish the stack at any time by simply forcing back the finger 35 against the force applied by the weight connected to the carriage 36 through the string and adding the desired number of new labels to the rear of the stack. The stack may thus be renewed without interfering with the continued operation of the machine as a whole. To overcome the inertia of the carriage 36 and to insure that the finger 35 is constantly pressing on the rear of the stack to urge the latter toward the left, as viewed in Fig. 1, a vibrating device 42 of suitable construction is secured to the rear end of plate 26. The vibrating device is connected by electrical wires 43 and 44 through a normally open switch is switchbox 46 (note Fig. 1) to wires 50, 50, which are connected to a source of electrical energy. The switch in box 46 is controlled by a pivoted arm 47 carrying a member 48 which normally projects into the path of feed of the bottles 20 under the bias of a spring loaded roller 49 provided on box 46. When a bottle 20 is being carried by the conveyor 21 toward the point A of label application, it will force the member 48 outwardly causing arm 47 to close the switch connecting wires 43, 44, to feed wires 50, 50, and thereby connect the vibrator 42 to a source of current. It will be noted from Fig. 1 of the drawings, that the member 48 is long enough to enable successive bottles 20 to be in contact therewith so long as the succession of bottles being fed to the point of application A is unbroken. However, should such train of bottles be broken, the member 48 will be forced inwardly by the spring loaded roller 49, thereby opening the circuit of wires 43, 44. Thus, vibrator 42 will operate continuously if the feed of the bottles 20 is unbroken, will operate intermittently whenever the train of bottles is broken in the operation of the machine, and will cease operation when the passage of bottles past the member 48 has stopped even though other parts of the machine may remain functioning.

The forward end of the stack is pressed by the finger 35 into engagement with an abutment 55 provided on the forward end of side wall 27 (note Figs. 1, 2 and 8) and engaging a side edge portion of the coated face of the first label in the stack. The top edge portion of the coated face of the first label under the bias of finger 35 engages with the free bent end 56 of a spring finger 57 extending generally longitudinally over the top of the stack (note Figs. 1 to 4). The other side edge portion of the first label in the stack is engaged by a freely rotating roller 58 carried on the end of an arm 59 (note Figs. 1, 2 and 8). It will be seen more clearly from Fig. 8 of the drawings, that by reason of the abutment 55, the bent end 56 of finger 57 and the roller 58 on arm 59, the front of the stack is so formed that the first label in the stack is given a conformation such that it will not interfere with the operation of the label picking parts of the transfer mechanism C, but can be readily engaged and removed from the stack by such parts as will hereinafter become more clear. As shown more clearly in Figs. 3, 4 and 8 of the drawings, the finger 57 is secured at one end to a flat seat on the projecting portion of a rod 60 movably mounted in a block 61 which in turn is adjustably mounted on a vertically disposed bracket or guide 62 secured to the side wall 27 of the label hopper. The rod 60 within the block 61 is provided with a second flat seat to which is secured, as by a set screw 63, an arm 64 located in a slot in the block 61. The free end of arm 64 is threadedly engaged with the end of a set screw 65 which extends up through a passageway in block 61. The head of set screw 65 is maintained in engagement with the top surface of block 61 by a spring 66 located on the set screw and between the top wall of the slot and the arm 64. It will be noted that by reason of this construction, the bent end 56 of spring finger 57 can be initially substantially adjusted on the bracket 62 relative to the first label in the stack and then can be given a micrometer adjustment through adjustment of the set screw 65 to bring it into an exact relation with such label. The roller arm 59 is also adjustably mounted on a block 68 by means of a set screw 69 and the block 68 in turn is adjustably connected as by a set screw 70 to a vertical rod 71 mounted on the pick-up mechanism support 32 (note Figs. 1 and 8). Thus, the roller 58 on arm 59 may be engaged with any desired part of the adjacent end of the coated surface of the first label to hold such end of the label at any desired position with relation to the forward end of the side wall 28 of the label hopper. In this connection it will be noted from Fig. 8 of the drawings, that the arm 59 extends through a longitudinally extending slot provided in the forward end of side wall 28 to permit of such adjustment.

*Label activating drum*

As previously mentioned, the labels are successively fed from the hopper at the supply station B by label pick-up or transfer mechanism C to a drum 22 which transports the labels in spaced relation from the pick-up station D to the label applying station A (note Fig. 1). The drum 22 is substantially similar in construction to the label activating drum disclosed in the aforesaid von Hofe et al. Patent No. 2,525,741, and operates in a manner similar to that described with respect to the label activating drum of such patent. Thus, as in the activating drum of such patent, labels 135 are brought into engagement with the exterior surface of the drum 22 (note Figs. 5 and 8) with each label having its forward edge in firm abutment with one of the ribs 75 on such drum. The labels are disposed on the drum with their thermoactivatable adhesive coatings outward, and are retained in position against the drum by suction exerted through apertures which may be provided in the surface of the drum in the manner disclosed in the aforesaid von Hofe patent. During its movement from the pick-up station D to the label applying station A, each label becomes activated by the heated surface of the drum so that by the time it reaches station A, the adhesive coating thereof is thoroughly tacky. In order to make certain that the adhesive coating of each label is uniformly activated throughout its entire area in the event that the label is not completely and firmly held to the surface of the drum by the suction exerted through the apertures thereof, as for example, at the corners of the label, there is provided a curved reflector shield 76 which is secured in fixed relation on the housing for the mechanism which drives drum 22. As will be noted from Figs. 1 and 5 of the drawings, the curved shield 76 is spaced from the outer surface of drum 22 and extends from a point adjacent to the pick-up station D to a point adjacent to the label applying station A. The shield 76 is made of metal and the surface thereof opposing the outer surface of drum 22 is polished to a high reflective value to reflect the heat radiated by drum 22 into the space between the same and such drum surface. Thus, shield 76 together with drum 22 form a hot air chamber therebetween and through which the labels pass on their way from station D to station A. With this construction there is eliminated any possibility of the label not being completely and uniformly activated regardless of the manner in which it is supported on the drum 22. This arrangement also makes it possible to reduce the temperature at which it is necessary to maintain the drum 22 for a proper activation of the adhesive coatings on the labels and to maintain such drum temperature at such levels that inks or varnishes on the labels will not be deleteriously affected during the activation of the adhesive coatings of such labels.

The drum 22 differs from the activating drum of the aforesaid Patent No. 2,525,741 in the further respect that the bottom or end wall 77 thereof is provided with an annular or ring-shaped depending shoulder 78 defining the inner edge of the annular portion of such wall in which are located the openings 79 and 80 of the air passages in the outer side wall of such drum (note Fig. 6). Seated against such annular portion of the end wall 77 is a ring 81 provided with perforations 79', 80', which correspond to and are aligned with the air passageway openings 79 and 80, respectively, of the wall 77. The perforations 79' and 80' of the ring 81 are maintained in aligned relation with the openings 79 and 80, respectively, by a locating pin 82 provided on the ring 81 and received by a recess 83 in the end wall 77. The ring 81 rests on the upper edges of the fixed valve plate 84 (note Fig. 7), which in the construction disclosed is made of an integral casting divided by two partitions to form a dead chamber 85 and a chamber or port 86 which is in communication with a source of suction through the connection 87. The valve plate 84 is provided with a port 88 which communicates with a source of air pressure through a suitable connection. As the drum rotates, the openings or apertures 79' and 80' of the ring 81 register, or are in communication with the chamber 86 between the stations D and A, thereby causing suction to be applied on the outer surface portion of the drum overlying such chamber 86 so as to hold the labels to such surface during their travel between said stations. As each label reaches the label applying station A at which the port 88 is located, the associated opening 80' of the ring 81 will be brought into communication with the source of air pressure, causing the advancing or leading edge of the label to be blown off the drum and against the article, as shown in Fig. 5 of the drawings. The ring 81 is made of a carbon composition known in the trade as "Graphitar," and possessing good lubricating and insulating qualities so that such ring will readily slide with a minimum of friction on the fixed valve plate 84 on which it rests during the rotation of the drum and will insulate the heated drum from such plate. The ring 81 will also provide a good fluid-tight cover or top wall for the suction chamber 86 so that there is relatively little suction lost between the chamber 86 and the surface of the drum.

Located at the label applying station A is an air nozzle 89 (see Fig. 5), which is connected by a pipe 90 to a source of continuous air pressure and which is disposed to direct a stream of air between the drum and the label whose leading edge has been attached to an article in order to facilitate the removal of the label from the drum. The pipe 90 is provided with an electrical heating element 91 so that the air directed between the label and drum is in a preheated condition, thereby obviating the possibility of the adhesive coating on the label becoming chilled before the label is completely adhered to the article in a manner which will hereinafter become more clear.

*Label-transfer mechanism*

Figure 9:
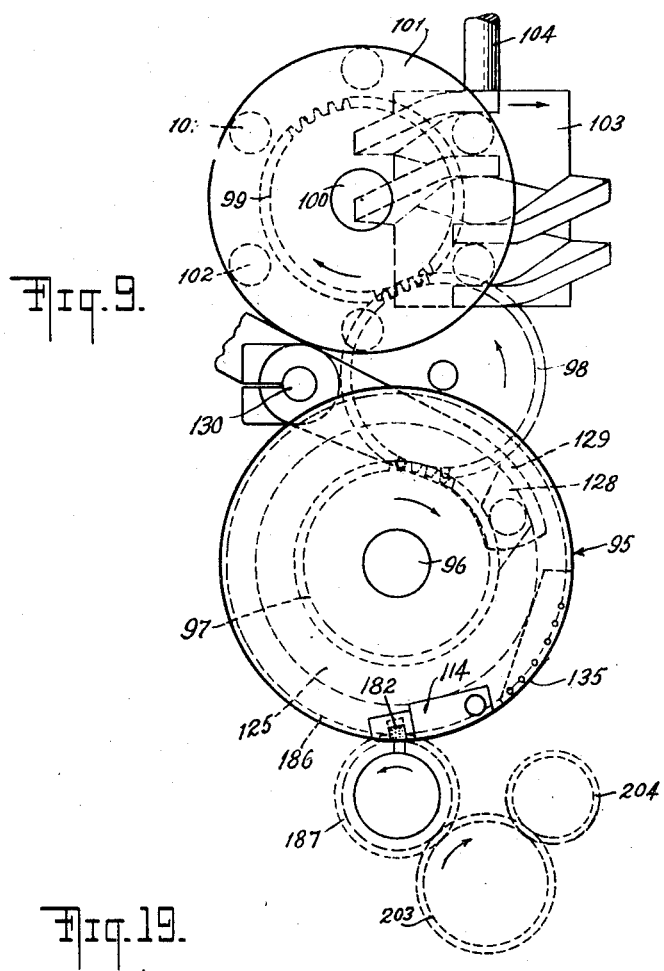
Fig. 9 is a top plan view of the means for driving the transfer drum and for activating the label transfer mechanism thereof.
Figure 10:
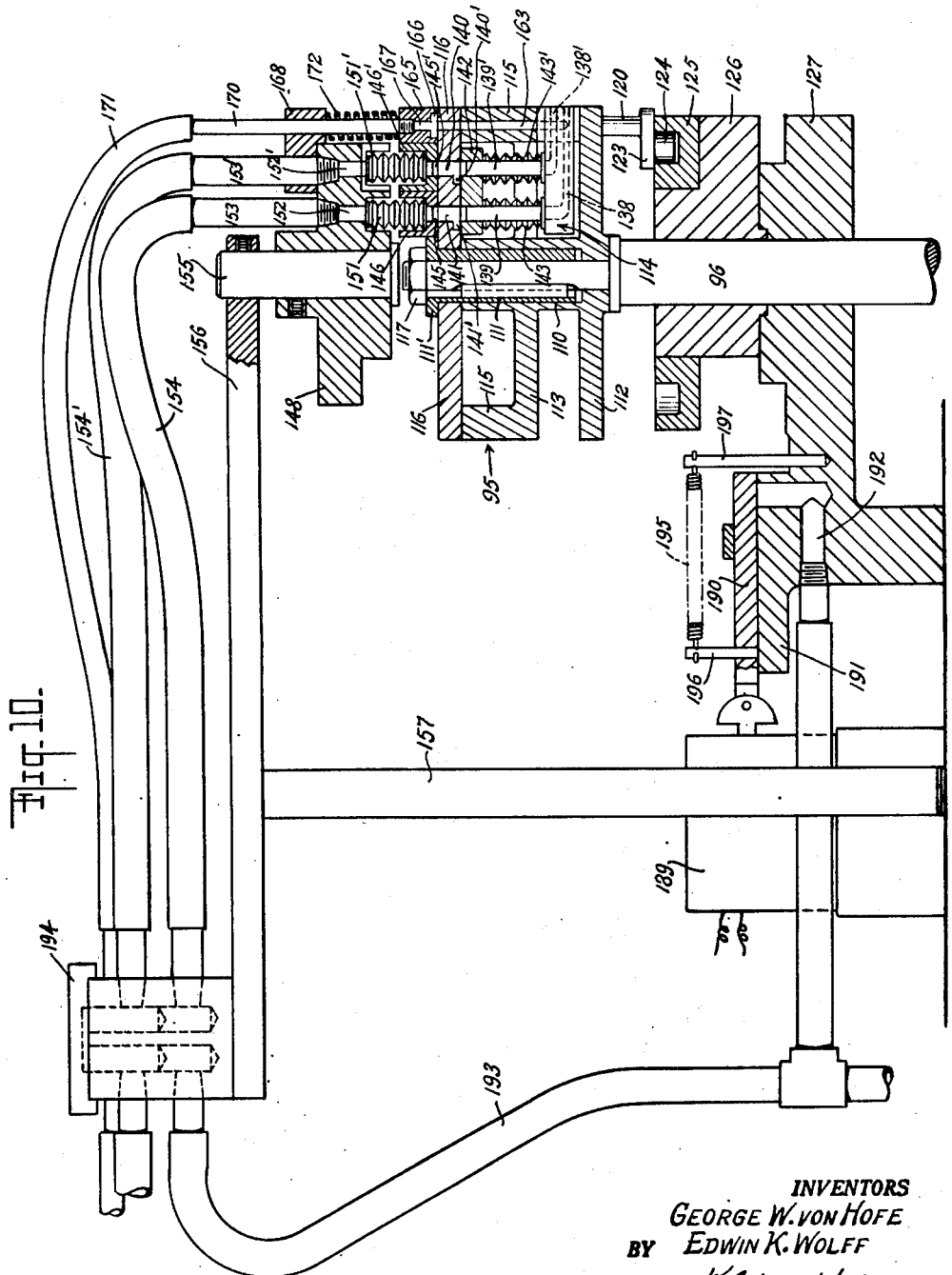
Fig. 10 is an elevational view, partly in section, of the label transfer mechanism.

As previously mentioned, the labels in the stack 24 are fed therefrom singly and in successive fashion to the heated activating drum 22 by the pick-up mechanism generally designated C. The label pick-up or transfer mechanism comprises a rotatable cylinder 95 operating intermittently and in timed relation to the movement of the heated activating drum 22. As shown in Figs. 8 to 10, the cylinder 95 is keyed to the upper reduced end of a shaft 96 to which is secured a gear 97 that is connected by an idler gear 98 to a gear 99 secured to a spaced vertically disposed shaft 100 (note Fig. 9) and having a diameter the same as gear 97. Secured to shaft 100 is a plate 101 provided with six equally spaced depending pins 102 which engage with a worm 103 provided on a continuously rotating shaft 104. The shaft 104 may be connected to a motor in substantially the same manner as the worm shaft for the transfer drum disclosed in the aforesaid Patent No. 2,525,741. It will be noted from Fig. 9 of the drawings that the thread on the worm 103 is so designed with relation to the pins 102 on plate 101 that two of such pins will always be positioned in the groove of such thread. Thus, as shown in Fig. 9, when one of the pins 102 is entering the groove of the thread at the left of the worm, as viewed in such figure, the adjacent right hand pin 102 which has been advanced one step during one revolution of the worm 103, will be at the discharge end of the worm groove. It will be noted that the entry and discharge ends of the worm thread are disposed at right angles or transverse to the longitudinal axis of the worm so that while the pins 102 are engaged with such portions of the thread, they are not moved about shaft 100, but are caused to dwell. The worm ends are designed to cause the pins 102 to dwell for approximately ninety degrees of each revolution of the worm 103. This intermittent rotating movement of the plate 101 will be transmitted to the drum 95 through shaft 100, gears 99, 98 and 97, and shaft 96.

The drum 95 is preferably made of an aluminum casting which comprises a vertically disposed hub portion 110 that is secured by a key to a steel liner 111 secured to the reduced portion of shaft 96 and provided at its upper end with a flange 111'. Integrally formed with the bottom end of the hub 110 is a plate 112 which forms the bottom wall of the drum 95. Spaced above the bottom wall 112 is a second or interior wall 113 integrally formed with the hub 110 of the drum. The two walls 112, 113 and the hub 110 together form an annular chamber or pocket within which are located three label removing mouthpieces 114 (note Figs. 10 to 12), and three vacuum segments 160. Each mouthpiece 114 is paired with a vacuum segment 160 and are in spaced relation to the other pairs of such parts. The openings of the annular chamber intermediate such pairs of parts is closed by arcuately-shaped plates 109 (note Fig. 11). The wall 113 has integrally formed therewith an annular wall 115 which together with mouthpieces 114, vacuum segments 160 and plates 109 form the side wall of the drum. The outside diameter of such composite side wall is the same as the outside diameter of the bottom wall 112. The upper edge of the annular wall 115 is flush with the top end of hub 110. Mounted on the top edge of wall 115 and the top of hub 110 is a steel plate 116 which is secured in position thereon by the flanged end 111' of the liner 111 and a nut 117 that is in threaded engagement with the top end of shaft 96.

As shown more clearly in Figs. 8 and 11 of the drawings, the three label removing mouthpieces are arranged at 120° intervals within the chamber between plates 112 and 113. Each mouthpiece includes a substantially triangularly-shaped portion 118 (note Fig. 12) and an offset portion 119 disposed at approximately 170° to the longitudinal axis of the portion 118. Approximately at the intersection of the longitudinal axes of the two portions 118, 119, the mouthpiece 114 is secured to a vertically disposed shaft 120. The upper end of shaft 120 is rotatably mounted in a split bearing block 121, secured in a seat formed in the side wall 115 of the drum 95. The lower end of shaft 120 is rotatably mounted in a bearing block 122 secured to plate 112 and projects through such block. Secured to the lower terminal end of shaft 120 is a cam arm 123 which carries a cam roller 124. The cam roller 124 rides in a track 125 secured to a block 126 through which shaft 96 extends and which is secured to a supporting plate 127 (note Fig. 10). As is shown more clearly in Fig. 9 of the drawings, track 125 has a movable segment 128 located adjacently to the label pick-up station B and carried on the outer end of a lever 129 mounted for pivotal movement about the axis of a shaft 130. As shown in Fig. 8 of the drawings, shaft 130 has connected thereto an arm 131 provided with a roller 132 which is spring pressed into engagement with the cam surface of a cam 133 carried by the continuously rotating shaft 104. It will be understood from this construction, that as cam 133 rotates, it will cause cam roller 132 and arm 131 to oscillate about the axis of shaft 130 and through shaft 130 cause lever 129 to oscillate about the same axis. The construction of cam 133 is so coordinated with the rotational movement of drum 95 that at the end of each intermittent movement of the latter a cam roller 124 of one of the mouthpieces 114 will come to rest on track segment 128 and that during the dwell or pause of drum 95, such segment 128 will be caused to move inwardly by lever 129 and thereby rotate mouthpiece shaft 120 to move the outer surface 134 of mouthpiece 114 into engagement with the outer label in the stack 24. Prior to the next intermittent movement of drum 95, cam 133 will cause the track segment 128 to be withdrawn into alignment with the remainder of track 125 so that cam roller 124 of the mouthpiece at station B can roll off track segment 128 and permit the cam roller 124 of the next succeeding mouthpiece 114 to come to rest on such track segment. As track segment 128 is then retracted, the label engaging surface 134 of the mouthpiece at station B will be withdrawn from the end of the stack 24 carrying with it the outermost label 135 of the stack.

The label engaging surface 134 of such mouthpiece 114 is provided with a group of suction apertures 136 and a group of suction apertures 137. The group of apertures 136 are connected by interior passageways 138 to a vertically disposed nipple 139 threadedly secured to the portion 118 of the mouthpiece 114, and the groups of apertures 137 are connected by interior passageways 138' to a vertically disposed nipple 139' threadedly secured to such mouthpiece portion 118. The nipples 139, 139' extend upwardly to a point just short of drum plate 116 which is provided with apertures 140, 141 in alignment with such nipples. It will be noted from Fig. 10 of the drawings that the lower sections 140', 141' of apertures 140, 141, respectively, are enlarged and have an arcuate shape to permit the nipples 139, 139' to remain in communication with such apertures during the pivotal movements of a mouthpiece 114 about its shaft 120 in the manner previously described. Loss of suction to the nipples 139, 139' during their pivotal movements about shaft 120 is prevented by an arcuately shaped valve plate 142 which is slidably mounted on the upper ends of both nipples 139, 139' of each mouthpiece and is maintained in tight engagement with the underside of plate 116 by bellows 143, 143' mounted on the nipples 139, 139' respectively. The bellows 143, 143' in addition to serving as springs, also serve as seals against the loss of suction to the nipples 139, 139' and in this latter function cooperate with the valve plate 142. The spring pressed valve plate 142 is preferably made of a suitable bearing material so that it slides with a minimum of friction on the underside of plate 116 during the pivotal movements of the nipples 139, 139'.

The upper ends of the apertures 140, 141 of plate 116 are in communication with arcuately shaped recesses 145, 145', respectively, which are formed on the underside of plates 146, 146' respectively (note Figs. 10 and 13), and which are enlargements of the apertures 147, 147', respectively, on such plates. The lengths of the recesses 145, 145' determine the period of time that suction is maintained at the groups of apertures 136, 137, respectively, on the label engaging surface 134 of each mouthpiece 114 during the operation of drum 95, and plates 146, 146' may be adjusted to vary such time periods. Plate 146 which is ring-shaped, is adjustably connected to an overlying fixed plate 148 by a pin 149, while segment-shaped plate 146' is adjustably connected to plate 148 by a pair of pins 150, 150. Plates 146, 146' are in the nature of shoes which slidably rest on the upper surface of plate 116 of drum 95, and their apertures 147, 147', respectively, are formed to provide seats for the lower ends of bellows 151, 151', respectively. The upper ends of bellows 151, 151' are seated in recesses provided on the underside of fixed plate 148 and are in communication with apertures 152, 152', respectively, in such plate. Apertures 152, 152' are connected by nipples 153, 153', respectively, and hose 154, 154', respectively, to separate sources of suction. Plate 148 is carried by a fixed pin 155 disposed in spaced relation above shaft 96 and in alignment with the latter. Pin 155 is supported on the outer end of an arm 156 carried by a standard 157 mounted on the frame of the machine.

Adjacently to the heel of each mouthpiece 114 is positioned a vacuum segment 160 secured in position in the annular recess provided between plates 112, 113 of the drum 95. Each vacuum segment is provided with a plurality of suction apertures 161 which are connected by internal passageways to openings 162 in the top of such segment. The holes 162 are in alignment with a plurality of passageways 163 provided in the side wall 115 of drum 95 and aligned at their upper ends with a plurality of apertures 164 in the top plate 116 of the drum. Slidably resting on plate 116 is a segment-shaped shoe 165 provided on its underside with an arcuately shaped recess 166, which is an enlargement of an aperture 167 in such shoe. The recess 166 is long enough to afford communication to all of the apertures 164 in plate 116 and consequently all of the passageways 163 in side wall 115, but by adjusting shoe 165 the time periods of the connection and disconnection of the rows of suction openings 161 with the source of suction may be selectively varied to take care of labels of varying lengths, as will hereinafter become more clear. Shoe 165 is adjustably connected to a ring 168 secured to fixed plate 148 by two vertically disposed pins 169. Threadedly connected to aperture 167 of shoe 165 is an air nipple 170 which is connected to a separate source of suction by a hose 171. A compression spring 172 mounted on nipple 170 between shoe 165 and ring 168 maintains such shoe pressed on the top plate 116 of drum 95.

It will be understood from the foregoing description of the mouthpieces 114 and their associated parts, that when the drum 95 comes to rest during its intermittent movements with one of the mouthpieces 114 located at the label pick-up station B, the nipples 139, 139' on such mouthpiece will be in communication with the arcuately-shaped lower sections 140', 141' of apertures 140, 141, respectively, so that suction will be provided at the groups of openings 136, 137, respectively, on the label engaging surface 134 of such mouthpiece. The mouthpiece 114 at station B is then pivoted in the manner previously described to advance the surface 134 thereof into engagement with the first label 135 in the stack 24, as shown in Fig. 8 of the drawings. As previously mentioned, the front end of the stack is formed by the abutment 55, bent end 56 of finger 57 and roller 58, so that one end portion of the first label has substantially the form of the surface 134, while the remainder of such label is maintained out of contact with the drum 95. Mounted on the side wall 27 of the label hopper is a tube 175 suitably connected to a source of continuous air pressure and having a discharge end formed to direct a stream of air between the outermost labels in the stack so as to separate the end labels from the rest of the stack. This directed stream of air also cooperates with the suction mouthpiece 114 to remove the first gripped label by pushing outwardly on such label as the mouthpiece is actuated to retract its surface 134. At the same time, the stream of air holds back the remaining labels in the stack during the removal of the first label therefrom. The mouthpiece 114 is actuated in the manner previously described to bring the label engaging surface thereof back to its normal position where it is flush with the side wall 115 of the drum 95. As the drum 95 moves through its next increment of 120°, the label is drawn from the stack. By the time that the label engaging surface of the adjacent vacuum segment 160 comes into opposed relation to the trailing end portion of the label being removed, the associated group of passageways 163 in the wall 115 of drum 95 will have come into communication with the arcuately-shaped lower section 166 of aperture 167 so that suction will be provided at the group of openings 161 of segment 160 to adhere such trailing portion to the label carrying surface thereof.

As previously mentioned, while all of the vertical lines of openings 161 will always be connected to the source of suction for equal time periods, the beginnings of such time periods at which such lines of openings are progressively connected to the source of suction and consequently the endings of such time periods at which such lines of openings are progressively disconnected from the source of suction, may be selectively varied by adjustment of the vacuum segment 165. This adjustment of the position of the segment 165 therefore, will determine when the trailing edge of the label will be completely released, thereby providing a control for the proper buckling of different length labels as they are being transferred from the drum 95 up against the abutment ribs 75 of the heater drum 22.

Suction is applied to the groups of openings 136 and 137 of mouthpiece 114 and the group of openings 161 of vacuum segment 160 throughout the aforesaid 120° increment of movement of the drum 95. In the initial portion of the second succeeding increment of movement from station B, and when the leading edge of the label 135 is moving into tangential relationship with the activating drum 22, the suction to the groups of openings 136, 137 is automatically discontinued and aperture 140 in plate 116 which is in communication with mouthpiece openings 136 through nipple 139 comes into communication with the enlarged lower section 176 of an aperture 177 in plate 146. As shown in Fig. 13 of the drawings, aperture 177 is formed to provide a seat for the lower end of a pipe nipple 178 which is arranged between the plate or shoe 146 and plate 148 and connected to a source of continuous air pressure in the same manner as bellows 139. Thus, as aperture 141 comes into communication with the enlarged section 176 of aperture 177, air pressure is supplied to the group of openings 136 of mouthpiece 114 to blow the leading end of label 135 out against the outer surface of drum 22, as shown in Fig. 8 of the drawings. The operation of the drums 22 and 95 are so timed with respect to each other, that the leading edge of label 135 when so discharged from mouthpiece 114 is brought against one of the abutment ribs 75 of the drum 22. As the following end of label 135 is still held by the suction applied thereto through the openings 161 of vacuum segment 160 and as the peripheral speed of the drum 95 is momentarily greater than that of the drum 22, at this portion of the former's movement, the label is caused to buckle, as indicated in Fig. 8, to assure a tight and firm positioning of the label against a rib 75. As the label encounters the drum 22, the suction emanating from the parts thereof immediately manifests itself to grip the label to the label carrying surface thereof, as previously explained. The suction applied through openings 161 of suction segment 160 may be automatically discontinued soon after the discontinuance of suction through the mouthpiece openings 136, 137 to permit the trailing end of the label 135 to become suction gripped on drum 22, or if the label is sufficiently long, may be discontinued when the printing roll 183 rides on such trailing end of the label as will hereinafter become more clear.

It will be noted from Figs. 8, 11 and 12 of the drawings, that the groups of openings 136 and 137 of each mouthpiece 114 are separated by a recess 180 formed in the label supporting surface 134 of such mouthpiece. Extending through the recess 180 is a vertically disposed U-shaped support 181 that is secured in a recess provided in the side wall 115 of the drum 95, and in a recess provided in the bottom plate 112 of such drum. The recess 180 is of such shape that the support 181 will not interfere with the pivotal movements of the mouthpiece about shaft 120 in removing labels from the stack 24. Secured by the support 181 is a block 182 of rubber which extends the entire height of the drum 95 below the plate 116 and which provides a resilient backing in the application of printed matter to a label held to the label carrying surface of mouthpiece 114 by the suction applied at openings 136, 137. The printed matter is applied to the label by type provided on a vertically disposed printing roll 183 which is driven by shaft 96 through suitable gears 186 and 187 (note Fig. 9), so that such roll makes one complete revolution for every 120° increment of movement of drum 95, and then comes to rest at the end of such movement with drum 95. It will be noted from Fig. 8, that the arrangement of the drum 95, rubber backings 182 and printing rolls 183 is such that during the first increment of movement of a mouthpiece 114 away from station B, the type on such roll will have cooperated with the associated rubber backing 182 to apply printed matter to the label 135 carried by such mouthpiece. The printing roll 183 is drivingly connected by gears 203 and 204 to a rotatably mounted rubber coated ink roll 184 and a steel distributor roll 185, respectively. Gears 203 and 204 are connected through gears 187 and 186 to shaft 96.

The above described operation of the transfer drum 95 is the normal operation thereof, while articles 20 are being successively delivered to the label applying station A of the machine. However, should the train of articles be interrupted, means controlled by a switch in box 46 prevents the mouthpieces 114 from picking up labels from the stack. As previously mentioned, the box 46 is provided with a pivoted arm 47 carrying a member 48 adapted to be engaged by the articles being carried by conveyor 21. The arm 47 is pressed inwardly by a spring loaded roller 49 when an article is not in engagement with an article on such conveyor. The switch in box 46 controlled by arm 47 opens the circuit formed by wires 44 and 45 when an article is in engagement with the member 48, and the arm 47 has been moved outwardly against the tension of spring pressed roller 49, and connects wires 44 and 45 to the feed wires 50, 50 when the arm 47 has been moved inwardly by such roller 49 because of the absence of an article to engage member 48. The switch box 46 and its associated parts are so positioned on side bar 188 that an article 20 will be in engagement with member 48 of such switch mechanism, at the same time that a mouthpiece 114 of the transfer drum 95 has arrived at station B to pick up the label 135 which is to be applied to such article 20. As shown in Fig. 1 of the drawings, the wires 44 and 45 are connected to a solenoid 189 mounted on housing 32 of the label transfer mechanism. It will be seen more clearly in Figs. 8 and 10 of the drawings, that solenoid 189 is connected to a plate 190 slidably mounted on a portion 191 of plate 127. Plate portion 191 is provided with a passageway 192 which is connected at one end by hose 193 to a valve block 194 mounted on arm 156 and constructed to communicate such hose with the three sources that supply suction to the groups of openings 136 and 137 of the mouthpieces 114 and to the groups of openings 161 of the vacuum segments 160 adjacent to such mouthpieces. The slide 190 normally closes the other end of passageway 192 under the influence of a spring 195 connected at one end to such slide by a post 196 provided in the latter and connected at its other end by a post 197 provided on the plate 127. It will thus be seen that so long as the passageway 192 is closed by slide 190, suction will be applied to the label carrying surfaces of the mouthpieces 114 and the vacuum segments 160, to enable such parts to perform their above described functions in the operation of the machine. However, should arm 47 of the switch in box 46 move inwardly because no article is in engagement with the member 48 carried by such arm, solenoid 189 is energized to withdraw slide 190, thereby opening passageway 192 to the atmosphere. As a result of such opening of passageway 192, insufficient suction will be furnished by the hose between valve block 194 and the nipples 153, 153' and 170 to enable the mouthpieces 114 and the vacuum segments 160 to secure labels on the label carrying surfaces thereof.

It will be observed also from Fig. 8 of the drawings, that the slide 190 is provided intermediate its length with a projection 198 which in the advanced position of such slide, is out of alignment with a pin 199 provided on an arm 200 secured to shaft 130. Pin 199 and arm 200 are normally biased toward the slide 190 by a spring 201 which is connected at one end to a post 202 provided on the free end of arm 200 and which is connected at its other end to a post (not shown) provided on the portion 191 of plate 127. It will be understood that when the track segment 128 carried by lever 129 is in alignment with track 125, pin 199 will be spaced from slide 190 and plate portion 191. When cam roller 132 rides onto the low part of cam 133 to rotate shaft 130 and lever 129 in a clockwise direction, as viewed in Fig. 8, to advance the mouthpiece at station B into engagement with the stack, pin 199 will advance until it engages a side surface of plate portion 191 in back of projection 198, as shown in Fig. 8 of the drawings. When however solenoid 189 is energized in the manner previously explained, to withdraw slide 190, and thereby cut off the suction to the mouthpiece 114 and vacuum segment 160 at station B, projection 198 will move into the path of movement of pin 199 and thereby block such movement of the pin. This will lock the actuating mechanism of track segment 128 and prevent the latter from being moved to advance the mouthpiece 114 at station B to pick up a label. Thus, the solenoid 189 and its associated mechanism prevent both the supply of suction to mouthpiece 114 and vacuum segment 160 and the actuation of mouthpiece 114 into position to pick up a label when there is no article engaging the member 48, on the switch arm 47.

*Article advance*

As previously mentioned, the articles or bottles 20 are advanced to and past the label applying station A on a conveyor 21 which may be driven in the manner described in said von Hofe et al. Patent No. 2,525,741. The conveyor 21 of the instant invention differs from the article conveyor of said patent in that the article carrying plates thereof are divided in a lengthwise direction to provide two longitudinally extending spaced series 210, 211 of such plates as is shown more clearly in Fig. 1 of the drawings. Both series of such plates function as supports for the articles and together constitute the single conveyor 21. In the initial portion of the travel of the articles on the conveyor 21, the articles are brought into engagement with a rotating helically grooved cylindrical element 212 which operates to space the articles at a predetermined distance from one another. The articles are maintained in the helical groove of element 212 by a guide rail 213 adjustably mounted as by brackets 214 on the side supporting bar 188. It will be noted from Fig. 1 of the drawings, that the conveyor 21 and the guide rail 213 extend to points beyond the label applying station A, guide rail terminating at the entrance between a pair of longitudinally disposed belts 215, 216, and conveyor 21 terminating at a point intermediate the ends of such belts. Intermediate the ends of the article spacing element 212, the guide rail 213 is interrupted to provide a space for the switch element 48. Thus, the member 48 is in one respect a part of rail 213 and performs the functions of rail 213 along the length of the space it occupies.

Figure 14:
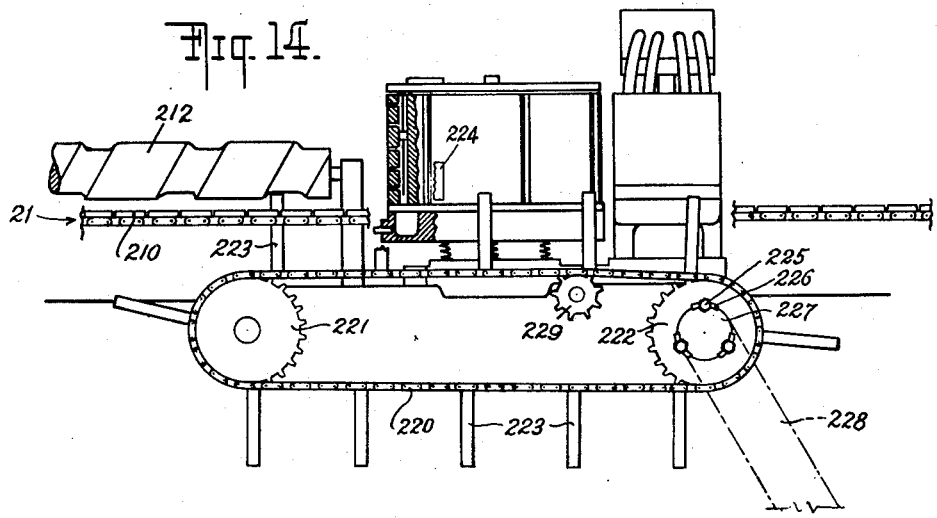
Fig. 14 is an elevational view, partly in section, of the mechanism for providing precise registration of the article with the label at the label applying station.

Positioned below conveyor 21 and extending longitudinally of the machine so as to bridge the space between the discharge end of the article spacing element 212 and the discharge end of guide rail 213, is a chain 220 carried by sprocket wheels 221, 222 (note Fig. 14). Chain 221 is provided with a plurality of outwardly projecting or radially extending fingers 223 which, during the movement of such chain in a clockwise direction, as viewed in Fig. 14 of the drawings, moves up into the space between the series 210 and 211 of article supporting plates to engage behind the articles resting on the conveyor 21. As shown in Figs. 1 and 14 of the drawings, the chain 220 is so arranged with relation to the article spacing element 212, and the fingers 223 are of such length, that as each finger 223 turns about sprocket wheel 221 to move up into the longitudinal space between the two series 210, 211 of conveyor plates, the outer end of such finger will move into position behind the article starting its travel in the last coil of the helical groove in such element 212. The feed of the chain 220 is so coordinated with the rotational movement of the spacing member 212 and the feed of conveyor 21, that such finger will follow the article during one complete revolution of such last coil of the member 212 at substantially the same rate of feed. After the article has left the spacing element 212, it is engaged by a spring impressed braking member 224 located on the same side of the conveyor 21 as element 212. The braking member 224 cooperates with guide rail 213 to retard the movement of the article 20 on conveyor 21 until it is engaged by the finger 223 following it. Finger 223 will then force the article past the holding finger or brake 224, which, because of its light pressure will readily give way. The movement of chain 220 is so synchronized with the rotational movements of drum 22, that each finger 223 approaching the label applying station A will position the advancing end of the label carrying surface of the article engaged thereby in exact registry with the leading edge of the label which is to be applied to such article. In other words, the fingers 223 will come into such registration or relation with the registering rib 75 against which the leading edge of such label abuts, that a given point on the bottle will come into registry with the leading edge of the label at the instant the latter is discharged from drum 22 at station A. It will be noted from Fig. 14 that sprocket wheel 222 is adjustably secured to a drive shaft 227 by means of bolts 225 which extend through arcuate slots 226 in such sprocket. By loosening bolts 225 and shifting sprocket wheel on shaft 227, the chain 220 may be shifted to adjust the fingers 223 relative to station A. As indicated in Fig. 14, shaft 227 may be connected by chain 228 to the drive for the drum 22. It will be noted from Fig. 14 of the drawings, that the axis of rotation of shaft 227 is slightly below the axis of rotation of the freely rotatable sprocket wheel 221, and that an idler sprocket 229 is located just beyond the applying station A to support chain 220 in the horizontal plane established by sprocket 221 until the label has been applied. Thus, as the fingers 223 advance toward sprocket wheel 222 from the idler sprocket 229, they will be gradually lowered so that at the point where they start turning about sprocket 222, they will be practically disengaged from the article. This arrangement eliminates any possibility of the fingers 223 tipping the articles over as they turn about sprocket wheel 222.

As each article continues its movement on the conveyor 21 beyond the station A, it is brought between the opposed rims of two belts 215 and 216 located at station E on opposite sides of such conveyor and extending longitudinally thereof. As shown in Fig. 1, belt 215 is supported by a freely rotatable pulley wheel 230 and a pulley wheel 231 mounted on a shaft 232. Secured to shaft 232 is a pulley 233 which is driven by a belt 237 connected to pulley wheel 234 mounted on shaft 235. Shaft 235 is suitably connected by gearing to a motor 236. In a similar manner belt 216 is driven by a motor 236' through pulley 234', belt 237', pulley 233', shaft 232' and pulley wheel 231'. Motors 236 and 236' are similar in construction and are adapted to drive their associated shafts 235 and 235', respectively, at the same rate of rotational speed. Pulleys 234 and 234' are variable speed pulleys and are adjustable to vary the rate of travel of their associated belts 237 and 237', respectively. It will thus be seen that by adjustment of variable speed pulleys 234, 234', belts 215 and 216 may be driven so that their inner or opposed runs travel at the same linear speed, or so that the inner run of one belt will travel at a slower or faster rate of linear speed than the inner run of the other belt, or so that one of such pulleys will be rendered inoperative to drive its associated belt 215 or 216 while the other belt may be given any desired velocity. By adjusting pulleys 234, 234' so that belts 215 and 216 respectively, travel at the same rate of speed as the conveyor 21, the two belts will merely exercise a pressing action on the label to complete the label attaching operation. This operation is especially adaptable to the labeling of articles provided with flat or slightly curved surfaces to which the labels are to be applied and makes it possible to label many types of articles having a shape other than cylindrical, such as the flat bottle 238 shown in Fig. 15 of the drawings. As shown in Fig. 16, pulley 234' may be rendered inoperative to drive belt 216, so that such belt has a zero velocity, while the pulley 234 associated with belt 215 may be adjusted to give the inner run of such belt a velocity twice that of the conveyor 21. With this adjustment of the pulleys 234, 234', the inner run of belt 216 becomes a stationary backing along which the article 239 is rolled by belt 215; the rotary motion being imparted to the article because belt 215 is traveling at a higher velocity than the conveyor 21. This type of operation is especially suitable to relatively large sized bottles which, because of their size are not likely to get out of control. Small bottles however, with such a difference in the velocities of the two belts, ordinarily come out from between the belts 215, 216 spinning so fast that they fall over. Accordingly, in the completion of the labeling of small bottles, it is preferred that the pulleys 234 and 234' be so adjusted that belt 216 be given a velocity less than that of the conveyor 21, and belt 215 be given a velocity greater than conveyor 21 and substantially equal to the velocity of conveyor 21 plus the difference in velocities of conveyor 21 and belt 216 as indicated in Fig. 17 of the drawings. With this arrangement of the belts 215, 216 and conveyor 21, an article 240 carried by the latter will be rotated between belts 215, 216 at a substantially slower rate of speed than is possible with the parts adjusted to the relative rates of speeds indicated in Fig. 16 of the drawings. The differences in the relative speeds of conveyor 21 and belts 215 and 216 can be so adjusted that the labeling operation on articles of relatively small diameter can be accomplished without danger of such articles falling over as they are discharged by the belts 215 and 216. The belt 215 and its driving mechanism are carried on a supporting means 241, which may be adjusted in a vertical direction by a hand crank 242 to vary the area of engagement of the belt 215 on the article in a vertical direction. In a similar manner the belt 216 and its driving mechanism are carried on a supporting means generally designated 243 and adjustable vertically by a hand crank 244 to vary the area of engagement of such belt with the article in a vertical direction. The supporting means 243 includes a platform 245 mounted for slidable movement in horizontal directions transverse to the conveyor 21 and upon which are rotatably supported the shafts carrying pulley wheels 230' and 231' of belt 216. Adjustment of platform 245 in a horizontal direction may be made through a hand wheel 246 whose stem is revolvably connected to a block 247 scured to such platform and is in threaded engagement with a block 248 secured to part of the supporting means 243 which is fixed relative to said platform. By adjusting platform 245, the spacing between the inner runs of belts 215 and 216 may be varied to accommodate articles of different dimensions. It will thus be seen that the construction and arrangement of the belts 215 and 216 and their associated parts are such that the machine is universally adaptable to the labeling of articles of all sizes and shapes.

*Operation*

It is believed that the operation of the machine will be readily understood from the foregoing description of the same, but for the sake of clearness, it might be briefly stated that during the intermittent movement of the drum 95 of the transfer mechanism C, the mouthpieces 114 of such drum will be actuated at station B to pick out the first labels in the stack 24 and such labels will be transferred in rapid succession at the pick-up station D to the heating drum 22. During the travel of the labels from station B to D, the printing roller 183 will apply printed matter thereto. This printed matter may be of any desired nature and may extend throughout the entire width of the label. Inasmuch as the rubber backing 182 is unbroken throughout the entire height of the cylinder 95, the printed matter will be impressed uniformly across the entire width of the label. The labels are retained on the adhesive activating drum by pneumatic suction throughout their path of travel from station D to the label applying station A. During this travel, the labels will pass through the heated chamber formed by the shield 76 and will be uniformly adhesively activated even though all parts of such labels are not in engagement with the outer surface of drum 22.

In the meantime, bottles or similar articles are advanced by the conveyor 21 toward and past the label applying station A. In their advancement, they are engaged by the helically grooved member 212 which spaces them at predetermined distances. If the line of articles is broken through some fault in the feed thereof to the conveyor 21, the absence of a bottle in the line will cause the switch mechanism controlled by feeder member 48 to actuate to energize solenoid 189. The operation of solenoid will cause the suction to be supplied to the label mouthpieces 114 to be dissipated to the atmosphere and will lock such mouthpieces against actuation. Thus, no labels will be picked up by the transfer mechanism C and delivered to the activating drum 22 until another bottle comes along to engage the feeler member 48. The feeler member 48 is so positioned on the apparatus that at the time a bottle engages such member, the label to be applied to such bottle will be picked out of the stack by a mouthpiece 114. This said label and bottle will meet at station A where the label will be applied to the bottle.

Before the bottles leave the spacing member 212, the positioning fingers 223 come up through the longitudinal space on conveyor 21 and each finger moves into position behind a bottle and travels therewith at approximately the same rate of speed. After the bottle leaves the spacing member 212, a braking member 224 engages the bottle and causes it to come into engagement with the finger 223 following the same. The movement of the fingers 223 is so coordinated with the movements of drum 22 that as a particular label to be applied to a particular bottle reaches station A, such bottle will come into exact registry with the label and the label will then be accurately and correctly applied to the bottle. As previously mentioned, the leading edge of the label is applied to the registered bottle by a blast of heated air at station A. The transfer mechanism C and drum 22 are adjustable in a vertical direction by suitable means such as those disclosed in the aforesaid von Hofe et al. Patent No. 2,525,741, so that the label will be applied to the article at the height of the bottle desired. As the bottle continues its travel on conveyor 21 and as the drum 22 continues its rotational movement, the label attached to the bottle will be progressively separated from the drum by the stream of heated air delivered by the discharge end of nozzle 90. If the bottle is circular in form, the label will be in a trailing position as the bottle encounters the label pressing belts 215 and 216. On the other hand, if the bottle has a flat or substantially flat surface to which the label is to be adhered, the label will overlie such surface but will not be completely adhered thereto as the bottle moves from station A to the pressing belts 215 and 216. As the bottle with the label attached thereto approaches the entry end of belts 215, 216, the associated registering finger 223 traveling with the same, moves downwardly through the longitudinally extending space in the conveyor 21 and out of contact with the bottle. The belts 215, 216 have been adjusted in the manner previously explained so that their relative velocities are suitable for the completion of the adhesion of the label on the particular form of bottle being labeled. As previously indicated, the action of the belts 215, 216 may consist of a pressing action only, or a pressing action accompanied by a predetermined rotational movement of the bottle, depending upon the shape of the bottle and its size. After the label has been completely adhered to the bottle by such belts, the bottle is discharged by such belts onto a receiving platform or conveyor suitably arranged at the discharge end of such belts.

It will be evident to those skilled in the art that many of the features of the instant machine may be modified without affecting the functions and advantages of other parts of the machine. For instance, the exact registry of the bottle with the label at station A may be accomplished without the use of registering fingers 223. An example of how this may be accomplished is illustrated in Fig. 18 of the drawings. It will be noted from the construction shown in Fig. 18 that the article carrying plates of the conveyor 21' are not split longitudinally and that the positions of the guide rail 213' and spacing member 212' are reversed from the positions previously described. Guide rail 213' is interrupted to provide a space for the feeding finger 48' on arm 47' to control the switch in box 46' and through the latter, such finger controls the operation of the label transfer mechanism C in the manner previously described. Guide rail 213' is also provided at label applying station A with an opening through which an arcuate portion of the drum 22' projects to enable the application of a label to an article at such station in the manner previously explained. Like guide rail 213, rail 213' extends to the entrance end of belts 215' and 216', which are constructed and operated in a manner similar to belts 215 and 216. Spacing member 212' however, is substantially longer than spacing member 212 and is of sufficient length to feed the article in predeterminedly spaced relation past station A and up to the entry end of belts 215' and 216'. The spiral groove in member 212 is so formed and the speed of rotation thereof is so coordinated with conveyor 21' and drum 22', that predetermined points on the articles will be brought into exact registry with predetermined portions of the labels delivered thereto at station A in the same manner disclosed with respect to the fingers 223, except that with the use of such a member, a braking member 224 is not required, as the articles are under control throughout their travel on the conveyor 21', while in engagement with such spacing member 212. It will thus be observed that member 212' in this embodiment performs a dual function. The first section of member 212' predeterminedly spaces the articles on the conveyor 21' in the same manner as the previously described member 212, while the second or other section of 212' functions as a registering means in the same manner as the fingers 223. Thus, one part of member 212' may be considered as an article spacing means, while another part thereof may be considered as a registering means. The spacing member 212' may have a helical groove similar in form to that provided on spacing member 212 or formed to accommodate articles having a cross sectional area other than round, such as the flat bottles 20' shown in Fig. 18. In a similar manner the groove in spacing member 212 may be formed to accommodate the particular shape of bottle being processed by the machine.

Figure 19:
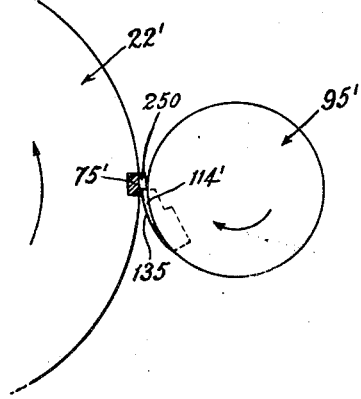
Fig. 19 is a schematic view showing a modified construction of the transfer and heating drums.

Instead of having the labels transferred in a buckled condition from the drum 95 to the drum 22, the labels may be skidded off the mouthpieces 114 of drum 95 and driven positively into position squarely against the ribs 75 of drum 22 without buckling. This operation may be accomplished as shown in Figs. 19 and 20 of the drawings, by arranging the drums 22' and 95' so that their peripheral surfaces are closely adjacent one another and by providing the ribs 75' with slots 250 through which the mouthpieces 114' on drum 95' pass during the rotational movement of the drums. Thus, as a mouthpiece 114' on drum 95' starts to pass through a slot 250 of a rib 75' on drum 22' in the operation of the machine, the leading edge of a label 135 will come into engagement with the spaced protruding portions of the rib and will be prevented from following the mouthpiece which is moving at a rate faster than the rib 75' in its passage through the slot of such rib. As the vacuum condition is still provided on the label bearing surface of the mouthpiece 114', the label will be in effect retarded in its forward movement to bring it to the speed of movement of the rib 75' and will be slid off or skidded off the mouthpiece onto the drum 22' as the mouthpiece moves relative to the rib. Suction is maintained on the label bearing surface of the mouthpiece 114' until the mouthpiece has moved through and past the particular rib 75' to which it has brought the label into engagement. The driving mechanism of drum 95' is so constructed and arranged that the mouthpiece is given its highest velocity at the time it is passing through the slot or notch 250 of a rib 75'. As a result of this, even though a label 135 may not be properly arranged on the mouthpiece 114' so that its leading edge engages with a rib 75' at an angle, as is indicated in dotted outline in Fig. 20 of the drawings, the label will be brought into proper registry with such rib, as shown in full lines of such figure. Thus, the labels will always be correctly positioned on drum 22' for proper application to the articles.

The foregoing construction makes it possible to transfer every label from the drum 95' to the drum 22' without improper engagement of the leading edge thereof with a rib 75' or the leading edge thereof slipping past a rib 75', as may occasionally happen when the labels are transferred in a buckled condition, as previously explained, and to properly and exactly register each label in a predetermined position on the drum 22' even though the labels may not be properly registered on the mouthpieces 114'. It is also of advantage in the handling of very small labels which cannot be easily bent to feed in a buckled condition to the heating drum. This construction has the further advantage that a positive control is exercised on the label until it is laid on the heating drum. This is of especial importance in obtaining precise labeling and especially in applying labels to articles which are not truly cylindrical, but may be conically or otherwise shaped. For example, if it is desired to adhere a rectangular label to a conically-shaped bottle, it is necessary that the label be deposited on drum 22' so that when the label is applied to the bottle it will spiral ino correct position and not be applied so that it will appear askew on the bottle. This is accomplished as shown in Fig. 21 by further modifying the form of rib 75" so that the label is disposed at the proper angle on the heating drum. The above described construction enables a proper seating of the label 135 in this position against the rib 75" even though the longitudinal axis of the label as it approaches the heating drum is parallel to its path of movement on the mouthpiece of the transfer drum.

It will be evident also to those skilled in the art that various other changes and modifications of the parts of the machine may be made without departing from the spirit of the invention or the scope of the appended claims.

I claim:

1. In a labeling machine, a label feeding means adapted to transport a plurality of labels over a predetermined path to a label applying station, registering devices carried by said feeding means for positioning the labels on said feeding means in predetermined spaced relation, means for successively placing labels on said feeding means in engagement with said registering devices, means for carrying articles to be labeled to and past said label applying station, and means movable relative to said carrying means for bringing articles on the latter into registry with the registry devices on said label feeding means at said label applying station, and means for successively applying the labels engaged with said registry devices to the articles successively registered at said station.

2. In a labeling machine, a label feeding means adapted to transport a plurality of labels over a predetermined path to a label applying station, registering devices carried by said feeding means for positioning the labels on said feeding means in predetermined spaced relation, means for successively placing labels on said feeding means in engagement with said registering devices, means for carrying articles to be labeled to and past said label applying station, and means movable relative to said carrying means for bringing predetermined portions of the articles on the latter into registry with predetermined portions of the labels engaging said registry devices at said label applying station without interruption in the feed of the labels and articles.

3. In a labeling machine, a label feeding means adapted to transport a plurality of labels over a predetermined path to a label applying station, registering devices carried by said feeding means for positioning the labels on said feeding means in predetermined spaced relation, means for successively placing labels on said feeding means in engagement with said registering devices, means for carrying articles to be labeled to and past said label applying station, and means movable relative to said carrying means for bringing articles on the latter into registry with said label registry devices at said label applying station, said last mentioned means being constructed and arranged to engage an article on said carrying means in advance of the label applying station and to maintain such engagement until after the label has been applied to the same.

4. In a labeling machine, a label feeding means adapted to transport a plurality of labels over a predetermined path to a label applying station, registering devices carried by said feeding means for positioning the labels on said feeding means in predetermined spaced relation, a conveyor for carrying articles from a place of article supply past said label applying station to a place of discharge, means movable relative to said article conveyor for bringing articles on the latter into registry with said label registering devices at said label applying station, said article registering means extending from a point between said place of article supply and said label applying station to a point between the latter and said place of discharge.

5. In a labeling machine, a label feeding means adapted to transport a plurality of labels over a predetermined path to a label applying station, registering devices carried by said feeding means for positioning the labels on said feeding means in predetermined spaced relation, a conveyor for carrying articles from a place of article supply past said label applying station, and means engageable with articles on said conveyor between said place of article supply and said label applying station to move the articles on the conveyor to positions where they will successively come into registry with said label registering means at said label applying station.

6. In a labeling machine, a feed drum for delivering labels to a label applying station and having registering means thereon to position the labels in predetermined spaced relation on such drum, means for successively placing labels on said drum in engagement with said registering means, means for carrying articles to be labeled to and past said label applying station, and means engageable with articles on said carrying means in advance of said label applying station to position the articles on said carrying means so that they will be fed in registry with said label registering means.

7. In a labeling machine, a label feeding means adapted to transport a plurality of labels over a predetermined path to a label applying station, registering devices carried by said feeding means for positioning the labels on said feeding means in predetermined spaced relation, a conveyor for carrying articles from a place of article supply past said label applying station, and means engageable with articles on said conveyor between said place of article supply and said label applying station to position the articles on said conveyor so that they will be fed in registry with said label registering devices, said article engageable means contacting each article with a predetermined portion thereof at the time of registry of such article with a label registering device.

8. In a labeling machine, a label feeding means adapted to transport a plurality of labels over a predetermined path to a label applying station, registering devices carried by said feeding means for positioning the labels on said feeding means in predetermined spaced relation, a conveyor for carrying articles to be labeled to and past the label applying station, and means engageable with articles on said conveyor in advance of said label applying station to position the articles on said conveyor in registry with said label registering devices, said article engaging means comprising a carrier provided with a series of equally spaced finger elements, means for moving said fingers into the path of travel of said articles at a point in advance of said applying station and for moving said fingers in following relation along the path of travel of said articles to and past said station, and at such velocity that the articles engaged thereby will successively register with said label registering devices at said label applying station.

9. In a labeling machine, a label feeding means adapted to transport a plurality of labels over a predetermined path to a label applying station, registering devices carried by said feeding means for positioning the labels on said feeding means in predetermined spaced relation, a conveyor for carrying articles to be labeled to and past the label applying station, means movable relative to said conveyor for bringing articles on the latter into registry with said label registering devices at said article applying station, said means being engageable with the articles at a point in advance of the label applying station, and means located in advance of the label applying station and constructed and arranged to successively hold the feed of the articles on said conveyor until the trailing end of such articles are engaged by said relatively movable means.

10. In a labeling machine, a rotatable heated drum adapted to transport a succession of labels on its peripheral surface from a pick-up station to a circumferentially-spaced label applying station past which the articles to be labeled are successively advanced, pneumatic means for retaining the labels on said drum surface between said stations and for successively blowing them off said surface as they reach the label applying station, said pneumatic means comprising a fixed valve plate provided with a port communicating with a source of suction and a port communicating with a source of pressure, said pressure port being located at said label applying station, a porting plate resting on said fixed valve plate and located between the latter and one end of said drum, and means removably connecting said porting plate to said end of the drum, said drum having a plurality of openings in said peripheral surface and internal passages between groups of such openings and said end of said drum, said porting plate having apertures aligned with the internal passages in said drum and said plate being constituted of insulating material.

11. In a labeling machine, a rotatable heated drum having means for holding labels effective at the peripheral surface thereof and adapted to transport a plurality of such labels in a spaced series from a pick-up station to a circumferentially-spaced discharge station, a shield extending in the direction of the rotation of said drum from a point adjacent to said pick-up station to a point adjacent to said discharge station, means fixedly supporting said shield in spaced relation to the peripheral surface of said drum, said shield having a curvature substantially similar to that of the peripheral surface of said drum and being so spaced from the latter that the two define a curved, heated chamber through which the labels travel in their passage from said pick-up station to said discharge station.

12. In a labeling machine, a rotatable drum adapted to transport a succession of labels on its peripheral surface from a pick-up station to a circumferentially-spaced label applying station past which the articles to be labeled are successively advanced, pneumatic means for retaining the labels on said drum surface between said stations and for successively blowing the leading ends of such labels off said surface and onto the articles at the label applying station without stopping the advancing movement of the labels and the articles, and a nozzle located at said label applying station and constructed and arranged to direct a stream of air in opposed relation to the path of movement of the label delivered to such station and between such label and said surface of the drum.

13. In a labeling machine, label feed means for carrying a label by vacuum along a predetermined path, said means comprising a first suction member adapted to adhere to the label carrying surface thereof one portion of a label and a second suction member positioned adjacently behind said first suction device in the direction of feed of the label and adapted to adhere to the label carrying surface thereof a following portion of such label, means for providing suction at the label carrying surface of said first member for a predetermined interval, and means for providing suction at the label carrying surface of said second member as the end of said predetermined interval is terminating, whereby the label is successively gripped at two portions thereof while carried by said feed means.

14. In a labeling machine, an intermittently operated label feed drum, a suction mouthpiece having a label carrying surface, means pivotally supporting said mouthpiece on said drum, means normally maintaining said mouthpiece in a retracted position, means operable during a period of dwell of said drum to pivot said mouthpiece to advance said surface thereof outwardly of the periphery of said drum and to retract the same to normal position, and means for providing suction at such surface of the mouthpiece during the advancing and retracting movements thereof and for a predetermined period after such dwell.

15. In a labeling machine, an intermittently operated label feed drum, a suction mouthpiece having a label carrying surface, means pivotally supporting said mouthpiece on said drum, means normally maintaining said mouthpiece in retracted position, means operable during a period of dwell of said drum to swing said mouthpiece to advance said surface thereof outwardly of the periphery of said drum and to retract the same to normal position, means for providing suction at such surface of the mouthpiece during the advancing and retracting movements thereof and for a predetermined period after such dwell, a vacuum segment fixedly mounted on said drum and having a label carrying surface forming a continuation of the surface of said mouthpiece, and means for providing suction to the label carrying surface of said segment for a predetermined period.

16. In a labeling machine, a support for labels, an intermittently operated feed drum, an oscillatable suction mouthpiece mounted on said drum and having a label carrying surface, a cam follower having an arm attached to said mouthpiece, a closed cam in which said follower rides, said closed cam having a movable portion on which said follower rests during a dwell of said feed drum, said movable cam portion being located adjacent to said label support, and means to move said movable cam portion during a period of dwell of said drum to oscillate said mouthpiece so as to cause said surface thereof to move into engagement with a label on said support and to be retracted therefrom.

17. In a labeling machine, an intermittently operated label feed drum, a suction mouthpiece contained between the ends of said drum and having a label carrying surface forming part of the periphery of said drum, means pivotally supporting said mouthpiece in said drum, means operable during a period of dwell of said drum to pivot such mouthpiece outwardly to advance the label carrying surface thereof beyond the periphery of said drum and to retract such mouthpiece so that it again forms part of the drum periphery, pneumatic means carried by said mouthpiece and formed to maintain the latter in communication with pneumatic apertures in one end wall of said drum during the pivotal movements of said mouthpiece, and fixed pneumatic means connected to said end wall of said drum and constructed and arranged to be in communication with such end wall apertures during predetermined portions of the rotation of said drum.

18. In a labeling machine, means supporting a source of label supply, means for successively picking labels from such label source and delivering the same to a label applying station, means for carrying articles along a predetermined path to said label applying station, indexing means located along the path of travel of the articles on said carrying means and successively engageable by such articles, and means controlled by said indexing means for controlling the pick-up of labels at said label source by said label picking means.

19. In a labeling machine, means supporting a source of label supply, label feeding means for delivering labels to a label applying station and including a suction device movable into engagement with said label source, means for actuating said suction device to remove individual label from said source, means for carrying articles along a predetermined path to said label applying station, indexing means located along the path of travel of the articles on said carrying means and engageable by articles on the latter, a switch controlled by said indexing means and means controlled by said switch and operative to render said suction device inoperative to pick up a label from said source of supply when an article is not in engagement with said indexing means.

20. In a labeling machine, means supporting a source of label supply, intermittently operable label feeding means, means carried by said feeding means for removing successive labels from said label supporting means during the periods of dwell thereof, printing means including a printing backing member carried by said feeding means and a type roller adjacent to said means, and means operable to cause said printing means to apply printing matter to labels carried by said feeding means while such labels are being carried away from said label supporting means.

21. In a labeling machine, means for supporting a supply of labels, an intermittently operative label feed drum, a label feeding device mounted on said drum and oscillatable thereon, means for actuating said device to remove an individual label from said source during a period of pause of said drum and to position a portion of such removed label in the plane of the periphery of said drum, and means for printing on said label portion during the rotative movement of said device away from said source.

22. In a labeling machine, means for supporting a stack of labels including a label hopper and means mounted on said hopper and engaging the first label thereof to form the labels in the head of said stack to a predetermined shape other than flat and such that the first label has a substantially flat portion engageable by a label removing member and a portion withdrawn from such flat portion, intermittently operable feed means, a label removing member movably carried by said feed means and having a label carrying surface, means for advancing the label carrying surface of said member into engagement with the flat portion of the first label and for retracting the same, means for supplying suction to the label carrying surface of said member during the advancement and retraction thereof and means carried by said label support for assisting in the removal of said first label and for holding back the succeeding labels during such removal.

23. In a labeling machine, means for feeding articles past a labeling station at which labels are adhesively secured to such articles in successive fashion, and means for completing the application of the labels to the articles, said last mentioned means comprising a pair of cooperating elements between which the labeled articles pass and having article engaging surfaces movable along the path of travel of such articles, means for moving the article engaging surfaces of said elements, and means to adjust the velocity of the article engaging surface of one of said elements relative to the velocity of the article engaging surface of the other of said elements.

24. In a labeling machine, a conveyor for carrying articles to and past a labeling station at which labels are adhesively secured to such articles in successive fashion, a pair of belts located beyond said labeling station to complete the application of labels to the articles, the inner runs of said belts being in spaced opposed relation and extending longitudinally of said conveyor, and the latter carrying the labeled articles between said inner runs of the belts, means for moving the inner runs of said belts in the same direction as the direction of feed of the conveyor, and means for varying the velocity of the inner run of each of said belts relative to the velocity of said conveyor and to the velocity of the inner run of the other belt.

25. In a labeling machine, label feeding means adapted to transport a plurality of labels over a predetermined path to a label applying station, said label feeding means comprising a plurality of movable label carrying devices, and means on said devices constructed and arranged to cooperate during the movements of such devices to transfer a label from one device to the other with a skidding, sliding action while maintaining control of the label during such action.

26. In a labeling machine, label feeding means adapted to transport a plurality of labels over a predetermined path to a label applying station, said label feeding means comprising a pair of label carrying devices having different rates of movement at a label transfer station so that they are movable relative to each other at such station, and means on said devices constructed and arranged to cooperate during the relative movement of said devices at said label transfer station to transfer labels from one device to the other with a skidding, sliding action while maintaining control of the label during such action.

27. In a labeling machine, a rotating drum having means for holding labels effective at the peripheral surface thereof, a series of longitudinal positioning ribs on said drum surface, said ribs having notches therein arranged in aligned relation, and label carrying means constructed and arranged to pass through the notch of one of said ribs at a label transfer station and cooperating with such rib during its passage through such notch to transfer a label carried thereby to said drum.

28. In a labeling machine, a rotating drum having means for holding labels effective at the peripheral surface thereof, a series of longitudinal positioning ribs on said drum surface, said ribs having notches therein arranged in aligned relation, the inner surfaces of such notches being flush with the outer peripheral surface of said drum, and label carrying means constructed and arranged to pass the label carrying surface thereof through the notch of one of said ribs at a label transfer station and thereby to bring the leading edge of a label on said surface into engagement with said rib, said label carrying means cooperating with said rib during the passage of the surface thereof through said notch to transfer the label carried thereby to said drum.

29. In a labeling machine, a rotating drum having means for holding labels effective at the peripheral surface thereof, a series of transverse positioning ribs on said drum surface, said ribs having notches therein arranged in aligned relation, label carrying means constructed and arranged to pass the label carrying surface thereof through the notch of one of said ribs at a label transfer station, means for moving the surface of said label carrying means through such rib at a relatively greater velocity than the peripheral velocity of said drum, said label carrying means cooperating with such rib during the passage of the surface thereof through the notch of said rib to transfer a label carried by such means to said drum.

30. In a labeling machine, a rotating label carrying drum having means for holding labels effective at the peripheral surface thereof and having a series of transverse label positioning members projecting from the label carrying surface thereof, a label transfer mechanism for presenting labels in a successive fashion to said drum, said drum and label transfer mechanism being so constructed and arranged that a label being transferred from said mechanism to said drum is closely confined between the two, and while being confined is brought into abutting relation against a positioning member on said drum.

References Cited in the file of this patent

UNITED STATES PATENTS

| | | |
|---|---|---|
| 1,278,659 | Howe | Sept. 10, 1918 |
| 1,969,660 | McLaurin | Aug. 7, 1934 |
| 2,296,201 | Carter | Sept. 15, 1942 |
| 2,342,583 | Hoppe et al. | Feb. 22, 1944 |
| 2,391,694 | Everett | Dec. 25, 1945 |
| 2,525,741 | Von Hofe et al. | Oct. 10, 1950 |
| 2,542,282 | Lissimore | Feb. 20, 1951 |
| 2,594,679 | Pohl | Apr. 29, 1952 |
| 2,613,007 | Von Hofe | Oct. 7, 1952 |
| 2,635,776 | Cook et al. | Apr. 21, 1953 |

FOREIGN PATENTS

| | | |
|---|---|---|
| 286,716 | Germany | Aug. 23, 1915 |
| 687,452 | Belgium | Apr. 30, 1951 |